United States Patent
Sipila et al.

[11] Patent Number: 5,149,353
[45] Date of Patent: Sep. 22, 1992

[54] METHOD FOR INTERMITTENTLY STORING PAIRS OF GLASS SHEETS IN A WINDSHIELD PRODUCTION LINE

[75] Inventors: Eero Sipila; Erkki Yli-Vakkuri, both of Tampere, Finland

[73] Assignee: Tamglass Oy, Tampere, Finland

[21] Appl. No.: 556,435

[22] Filed: Jul. 24, 1990

Related U.S. Application Data

[63] Continuation-in-part of Ser. No. 343,333, Apr. 26, 1989, abandoned.

[30] Foreign Application Priority Data

May 11, 1988 [FI] Finland .................................. 882194

[51] Int. Cl.⁵ .............................................. B65G 49/00
[52] U.S. Cl. ......................................... 65/107; 65/289;
432/5; 414/786; 414/155; 414/191; 414/225;
414/626; 414/273; 414/924; 414/586; 414/267;
198/345.1
[58] Field of Search ............... 414/923, 924, 154, 155,
414/191, 222, 225, 226, 787, 626, 627, 268, 269,
270, 273, 274, 277, 279, 586, 286, 786, 267;
65/260, 107, 289; 432/239, 5; 198/345.1

[56] References Cited

U.S. PATENT DOCUMENTS

| | | | |
|---|---|---|---|
| 3,262,420 | 7/1966 | Bossi et al. | 414/155 X |
| 3,279,664 | 10/1966 | Lynch. | |
| 3,664,520 | 5/1972 | Parnet | 414/799 X |
| 3,907,132 | 9/1975 | McMaster et al. | 414/155 |
| 3,982,642 | 9/1976 | Muller | 414/268 |
| 4,035,904 | 7/1977 | Ishizaka et al. | 29/563 |
| 4,120,629 | 10/1978 | Christian et al. | 425/135 |
| 4,377,986 | 3/1983 | Juve | 118/696 |
| 4,420,361 | 12/1983 | Valimont et al. | 198/345.1 X |
| 4,497,645 | 2/1985 | Peltonen | 65/114 |
| 4,773,523 | 9/1988 | Hansen, Jr. et al. | 198/420 |
| 4,820,101 | 4/1989 | Fenn | 414/21 |

FOREIGN PATENT DOCUMENTS

| | | | |
|---|---|---|---|
| 1235812 | 9/1964 | Fed. Rep. of Germany | 414/266 |
| 1932418 | 6/1969 | Fed. Rep. of Germany | 414/586 |
| 62-259903 | 11/1987 | Japan | 414/274 |

Primary Examiner—Frank E. Werner
Attorney, Agent, or Firm—Burns, Doane, Swecker & Mathis

[57] ABSTRACT

The invention relates to an intermediate storage system mounted adjacent to a bending furnace in a windshield production line, said system comprising a first intermediate storage (1) for pairs of flat glass sheets and a second intermediate storage (2) for pairs of bent glass sheets. Each intermediate storage includes a number of separate storage racks (3) for pairs of glass sheets and a carrier trolley (5, 9) for pairs of glass sheets. A carrier trolley (5) in first storage (1) is controlled for carrying pairs of glass sheets one at a time from storage racks (3) to the proximity of the loading end of a bending furnace (11) and carrier trolley (9) in second storage (2) is controlled for carrying pairs of bent glass sheets from the proximity of the end of bending furnace (11) onto the storage racks (3) of second storage (2).

10 Claims, 10 Drawing Sheets

METHOD FOR INTERMITTENTLY STORING PAIRS OF GLASS SHEETS IN A WINDSHIELD PRODUCTION LINE

RELATED INVENTIONS

The present application is a Continuation-In-Part of U.S. application Ser. No. 07/343,333 filed on Apr. 26, 1989, which is hereby abandoned in favor of the present application.

FIELD OF THE INVENTION

The present invention relates to systems useful for storing articles such as glass sheets between operations thereon. More particularly, the present invention relates to an intermediate storage system for pairs of glass sheets in a windshield production line.

BACKGROUND AND SUMMARY OF THE INVENTION

The present invention relates to an intermediate storage system for pairs of glass sheets positioned in a windshield production line adjacent to a bending furnace and comprising a first intermediate storage for pairs of flat glass sheets and a second intermediate storage for pairs of bent glass sheets. It is known to store the pairs of glass sheets on separate storage racks. A problem is that pairs of glass sheets must be carried manually over relatively long distances from storage racks to the loading end of a bending furnace. Similarly, the bent pairs of glass sheets must be carried from a bending mould to separate racks over a considerable distance. Thus, this known system requires a considerable amount of heavy human labor. In order to avoid this, automatic systems have been developed for moving the storage racks. However, this type of system will be heavy and bulky in construction. Automatization of the system is difficult and it cannot be readily fitted for cooperation with an automatically operating bending furnace.

Also known are conveyor systems for pairs of glass sheets, wherein individual pairs of glass sheets are carried upon rollers. This type of system is also bulky, automatization is difficult and it is poorly linkable with further processing of pairs of bent glass sheets.

An object of the invention is to provide an improved intermediate storage system having a light structure, simple automatization, flexibility for further processing, compact in construction and which can be used also in connection with an automatic bending furnace.

The above objects as well as other objects not specifically enumerated are accomplished by a method of intermediately storing pairs of glass sheets in accordance with the present invention. The method of intermediately storing pairs of glass sheets of the present invention includes carrying a pair of flat glass sheets, along with other pairs of flat glass sheets, on a first storage rack to a first intermediate storage, carrying the pair of flat glass sheets from the first storage rack to a first stand at an end of the first intermediate storage using a first carrier trolley, carrying the pair of flat glass sheets from the first stand to a bending furnace, bending the pair of flat glass sheets in the furnace, carrying the pair of bent glass sheets from the furnace to a second stand at an end of a second intermediate storage, carrying the pair of bent glass sheets from the second stand to a second storage rack in the second intermediate storage using a second carrier trolley, and carrying the pair of bent glass sheets, along with other pairs of bent glass sheets, on the second storage rack away from the second storage.

The objects of the invention are also accomplished by an apparatus for intermediately storing pairs of glass sheets, which includes first carrying means for carrying a pair of flat glass sheets, along with other pairs of flat glass sheets, on a first storage rack to a first intermediate storage, second carrying means for carrying the pair of flat glass sheets from the first storage rack to a first stand at an end of the first intermediate storage, wherein the second carrying means includes a first carrier trolley, third carrying means for carrying the pair of flat glass sheets from the first stand to a bending furnace, bending means for bending the pair of flat glass sheets in the furnace, fourth carrying means for carrying the pair of bent glass sheets from the furnace to a second stand at an end of a second intermediate storage, fifth carrying means for carrying the pair of bent glass sheets from the second stand to a second storage rack in the second intermediate storage, wherein the fifth carrying means includes a second carrier trolley, and sixth carrying means for carrying the pair of bent glass sheets, along with other pairs of bent glass sheets, on the second storage rack away from the second storage.

BRIEF DESCRIPTION OF THE DRAWINGS

The preferred embodiments of the present invention will be described in more detail with reference to the accompanying drawings, wherein like members bear like reference numerals and wherein.

DETAILED DESCRIPTION

Figure 1:
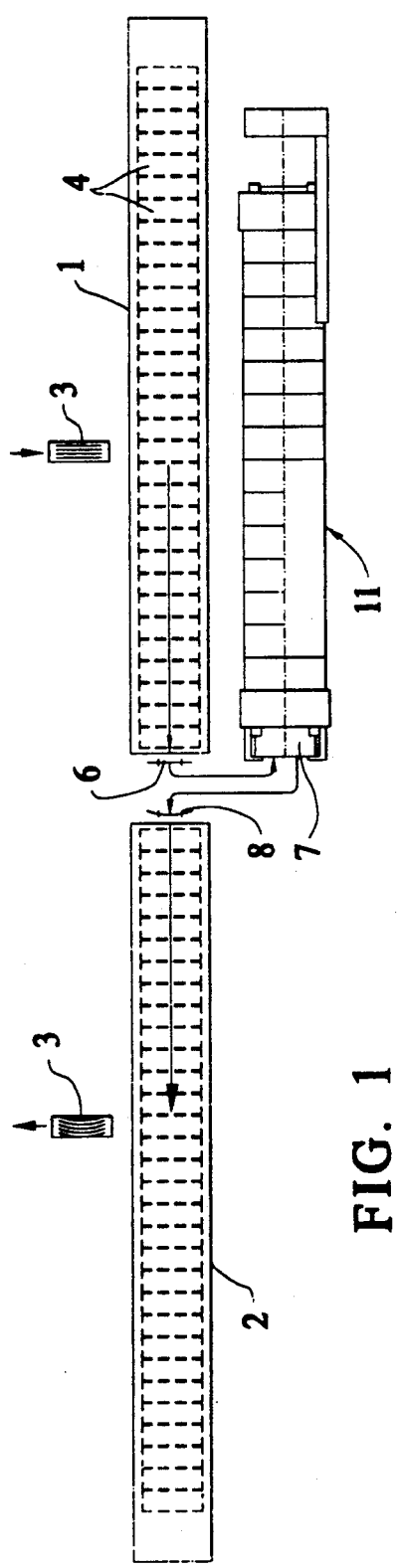
FIG. 1 is a schematic plan view of an intermediate storage system of the invention.
Figure 2:
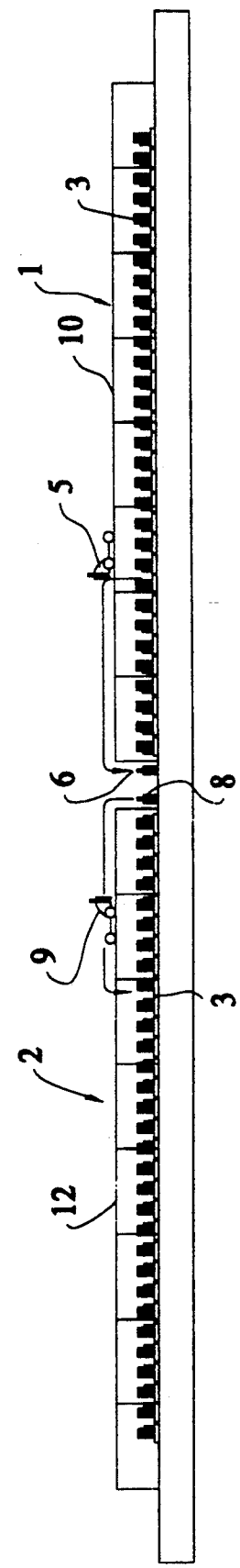
FIG. 2 is a side view of the intermediate storage system of FIG. 1 (without a bending furnace)
Figure 3:
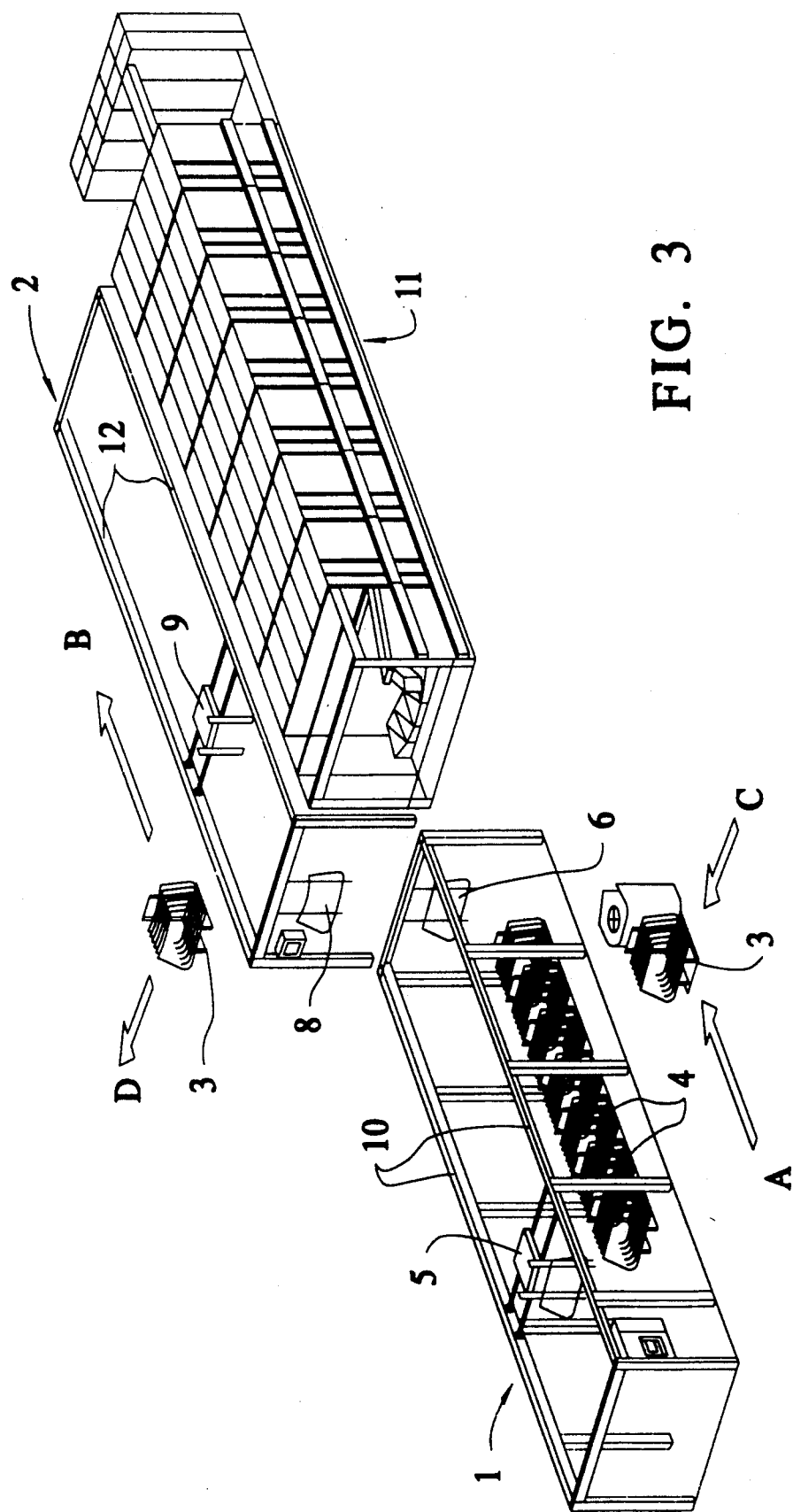
FIG. 3 is a perspective view of the intermediate storage system of FIG. 1.
Figure 6:
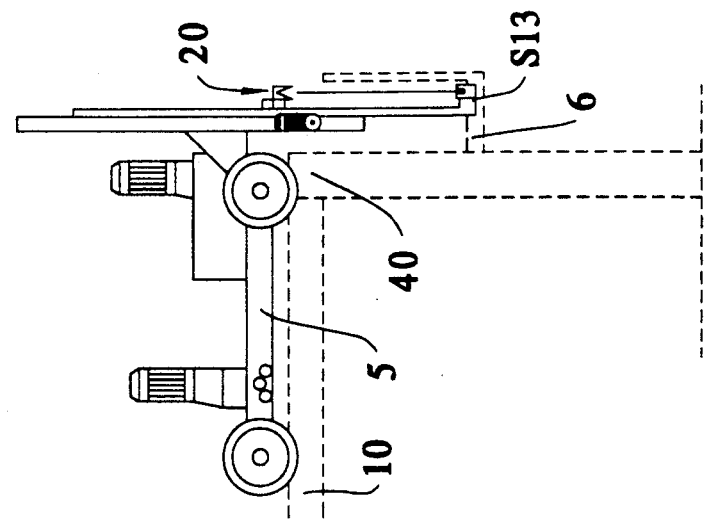
FIG. 6 is a side view of the trolley unloading the pair of flat glass sheets.

As shown in FIGS. 1–3, the system includes a first intermediate storage 1 for pairs of flat glass sheets and a second intermediate storage 2 for pairs of bent glass sheets. Each intermediate storage is provided with a number of separate storage racks 3 which can be constructed as disclosed in the Applicants' FI Patent application No. 873663, which corresponds to Applicants' U.S. Pat. No. 4,899,891, both of which are incorporated herein by reference. Each intermediate storage 1 and 2 is provided with preset locations 4 for storage racks 3.

As known, the glass sheets are always treated in pairs in the production of laminated windshields.

The pairs of flat glass sheets are carried by storage racks 3 to storage rack locations 4 of intermediate storage 1. Each storage rack 3 always carries pairs of exactly the same type of glass sheets. The number of storage racks in the system can be freely selected depending on a glass sheet bending furnace 11 and the number of various types of glass sheets run thereby.

On top of each intermediate storage 1 and 2 is a conveyor track 10 and 12 consisting of rails. Track 10 is provided with a carrier trolley 5 for pairs of glass sheets, as will be described hereinbelow, which picks up a pair of the desired type of glass sheets from its allocated storage rack 3 and brings it onto a stand 6 at the end of conveyor track 10 from which said pair of glass sheets can be carried either manually or automatically onto a bending mould 7 in bending furnace 11 for a bending operation. A bending furnace which may be used with the present invention is disclosed in U.S. Pat. No. 4,497,645, which is incorporated herein by reference.

The selection of a desired type of glass sheet can be controlled either by giving manually a piece of coded information to an apparatus controlling the movements of carrier trolley 5 or, if the question is about an automatically-operated bending furnace 11, by effecting data transmission directly from a furnace control system to a system controlling the movements of carrier trolley 5, as will be described hereinbelow.

The pair of bent glass sheets is lifted from a bending furnace mould 7 either manually or automatically onto a stand 8 at the end of intermediate storage 2 from which a carrier trolley 9 picks up the pair of glass sheets and carries it to a storage rack 3 positioned at a certain location 4 in the storage. Also in storage 2, each storage rack 3 always includes pairs of glass sheets of exactly the same type. The number of storage racks 3 depends on the number of various types of glass sheets to be run by means of bending furnace 11.

As shown in FIGS. 2 and 3, the conveyor tracks 10 and 12 for trolleys 5 and 9 are located above storage racks 3. This facilitates the setting of carrier trolleys 5 and 9 exactly on top of a desired pair of glass sheets. Control of the movements of trolleys 5 and 9 is preferably effected in a manner that the location data corresponding to the location 4 of each storage rack are stored in the memory of an apparatus controlling the movements of carrier trolley 5, 9. As will be described in more detail hereinbelow, when trolley 5 or 9 has reached the forward edge of a location 4 determined by the control, an identification means mounted on the trolley descends to an identifying position, whereafter the trolley advances until the identification means detects a first glass sheet on the storage rack and the trolley stops. In the case of trolley 5, a trolley-mounted clamping means or gripper assembly picks up and lifts the intended pair of glass sheets from rack 3. Trolley 5, carrying the pair of glass sheets with it, travels to the end of storage 1 whereat the trolley lowers the pair of glass sheets onto the stand 6.

Accordingly, as the trolley 9 stops, its clamping means or gripping assembly lowers a storage rack 3 of the pair of bent glass sheets into its first vacant storage location.

When a storage rack 3 in storage 1 for pairs of flat glass sheets has been exhausted, the unloaded storage rack is carried out of the storage for re-loading and is replaced by a fully loaded storage rack. Accordingly, when a storage rack 3 in storage 2 for bent glass sheets has become fully loaded, the rack 3 is carried away for further treatment of pairs of glass sheets and is replaced by an unloaded storage rack.

A storage rack 3 can be replaced manually by using a standard forklift or automatically by means of a so-called fracer wagon.

The operation of the carrier trolleys 5,9 will now be described in more detail with reference to FIGS. 4–13.

Figure 5:
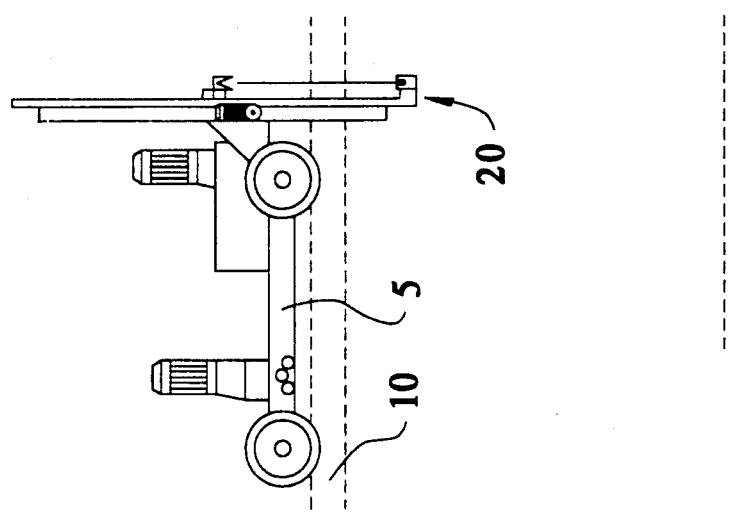
FIG. 5 is a side view of the trolley carrying the pair of flat glass sheets.
Figure 4:
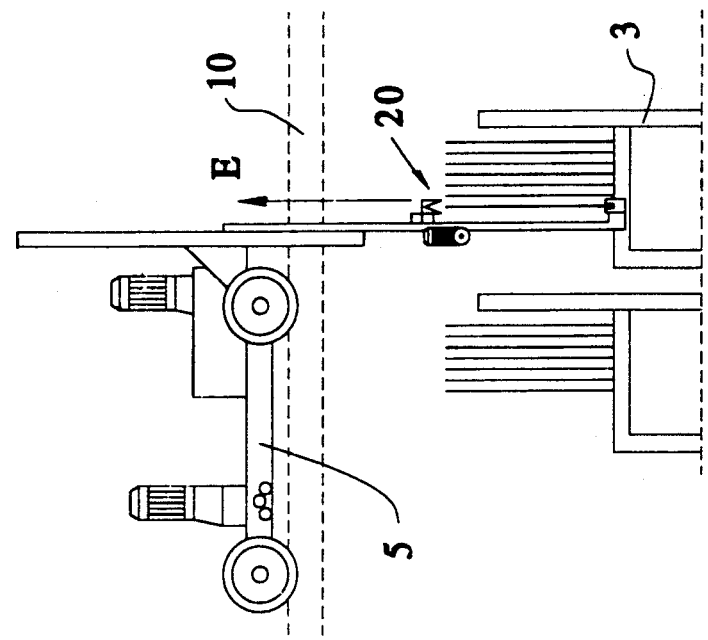
FIG. 4 is a side view of a trolley picking up a pair of flat glass sheets.

As shown in FIG. 4, a carrier trolley 5 riding on the track 10 operates to first remove a first, outermost pair of flat glass sheets from a specified storage rack 3 by gripping the pair of flat glass sheets with a gripper assembly 20, and lifting the pair of flat glass sheets in the direction of arrow E out of the storage rack 3. The trolley 5 then carries the pair of flat glass sheets along the track 10 in the gripper assembly 20 towards an end 40 of the first intermediate storage 1, as is shown in FIG. 5. Finally, the trolley 5 reaches the end 40 of the first intermediate storage 1 and lowers the pair of flat glass sheets into the stand 6 until a sensor S13 indicates that the pair of flat glass sheets has been completely lowered into the stand 6. The trolley 5 then moves away from the stand 6, and the pair of flat glass sheets is ready to be carried to the bending furnace 11, either manually, robotically, or by manipulator means.

Figure 7:
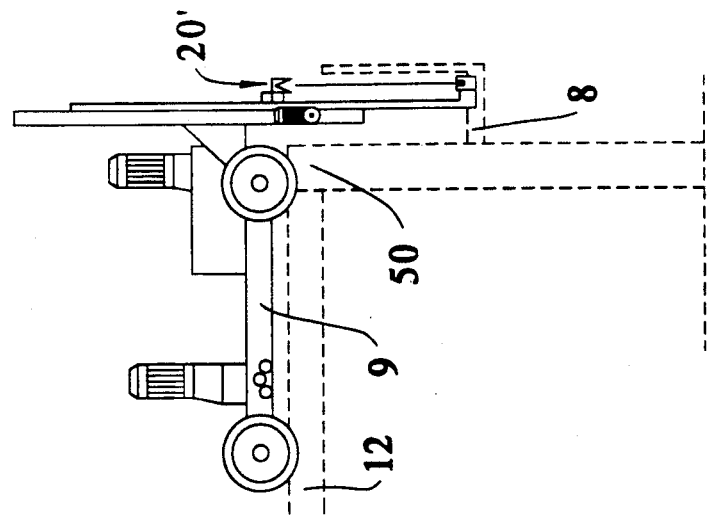
FIG. 7 is a side view of a trolley picking up a pair of bent glass sheets.
Figure 8:
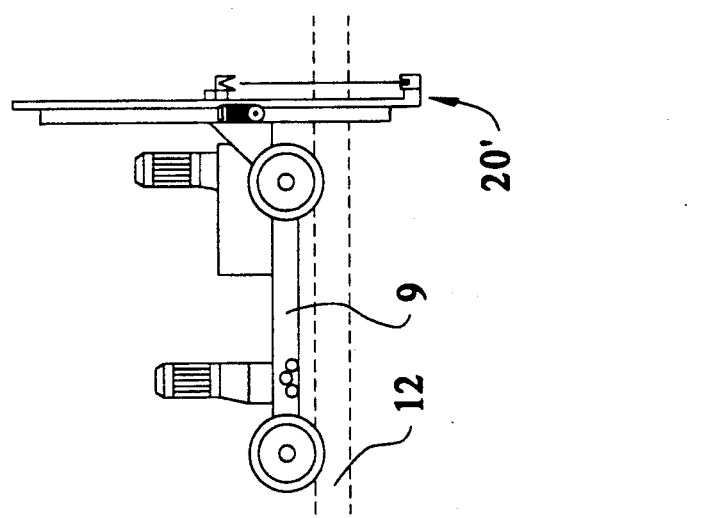
FIG. 8 is a side view of the trolley carrying the pair of bent glass sheets.
Figure 9:
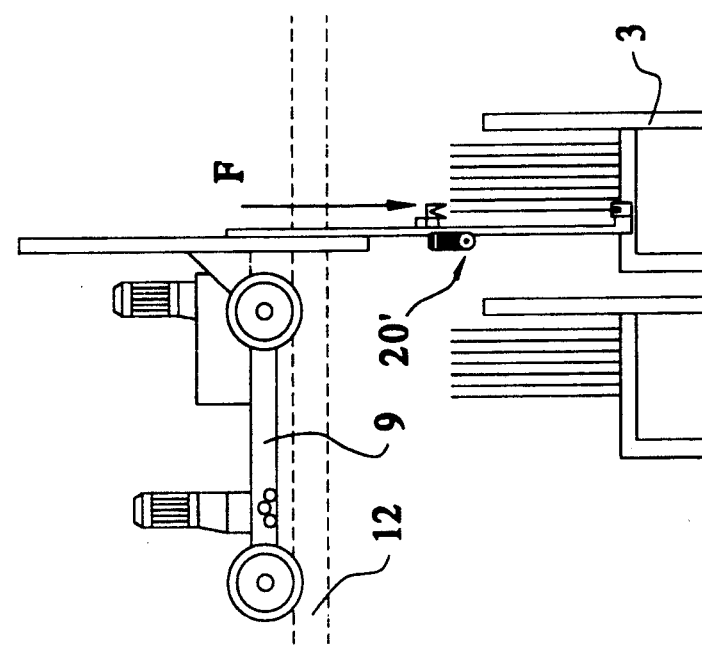
FIG. 9 is a side view of the trolley lowering the pair of bent glass sheets to a storage rack.

After the pair of sheets has been bent in the bending furnace 11 and has been carried, either manually or robotically, to the stand 8 of the second intermediate storage 2, the pair of bent glass sheets is ready to be stored in the second intermediate storage 2. As seen in FIG. 7, the trolley 9 then approaches the pair of bent glass sheets, lowers its gripper assembly 20' to grip the pair of bent glass sheets, and lifts the pair out of the stand 8. The trolley 9 then carries the pair of bent glass sheets in the gripper assembly 20' along the track 12 away from an end 50 of the second intermediate storage 2, as is seen in FIG. 8. Finally, the trolley 9 reaches a location above a selected storage rack 3 in the second intermediate storage 2, and lowers, in the direction of arrow F, the pair of bent glass sheets to a position on the storage rack 3, as is seen in FIG. 9. Once the pair of bent glass sheets is correctly located on the storage rack 3, the trolley 9 moves away from the pair of bent glass sheets, raises the gripper assembly 20', and moves on to its next task.

Figure 10:
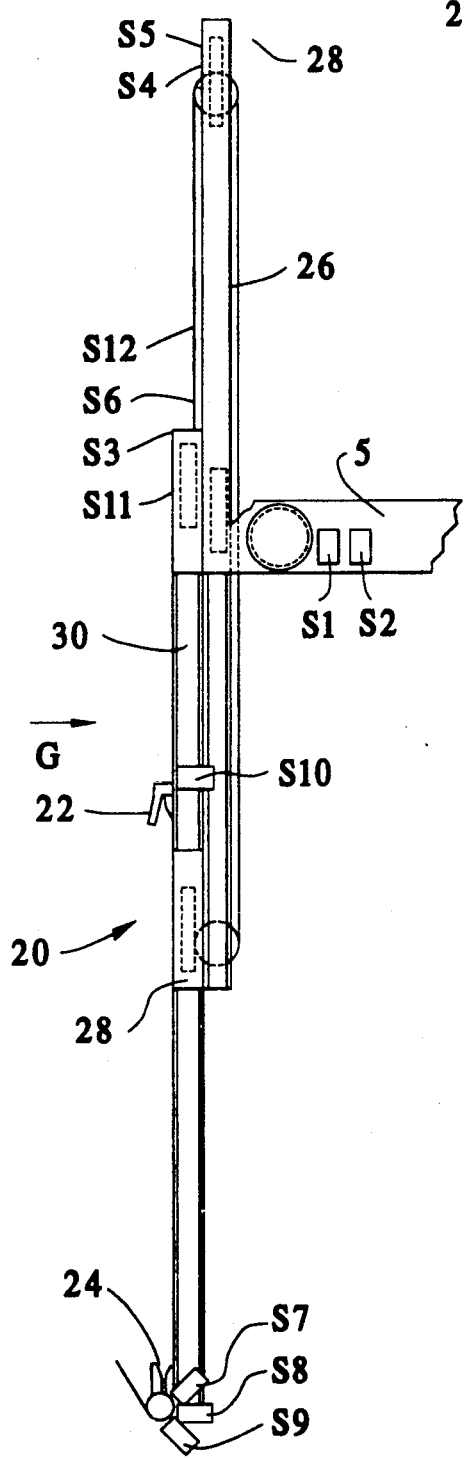
FIG. 10 is a partial side view of a trolley.
Figure 11:
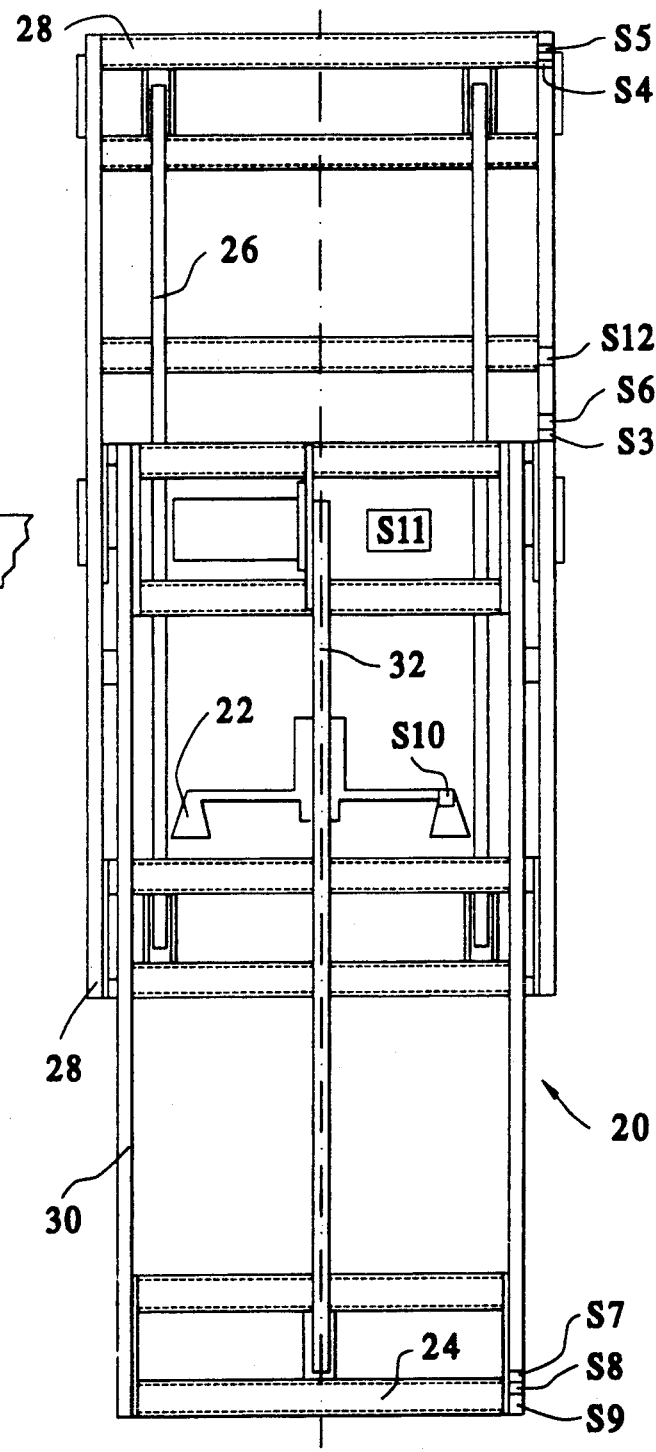
FIG. 11 is a side view of the trolley of FIG. 10 looking in the direction of arrow G.

FIGS. 10 and 11 show partial side views of the gripper assembly 20 of the trolley 5 in greater detail. Unless noted, the gripper assembly 20' of the trolley 9 is identical to the gripper assembly 20 in all essential features. The gripper assembly 20 includes an upper gripper 22 and a lower gripper 24, which are both mounted on a lower frame assembly 30 (the upper and lower grippers of the gripper assembly 20' may of course be shaped differently than shown in FIG. 10 to accommodate various shapes of bent glass sheets). The lower frame assembly 30 is slidingly mounted to an upper frame assembly 28 of the trolley 5, and may be driven either up or down relative to the upper frame assembly 28 by belts or chains 26. Additionally, the upper gripper 22 is slidingly mounted on the lower frame assembly 30, and may be driven vertically relative to the lower frame assembly 30 by a belt or chain 32

The gripper assembly 20 also includes a number of sensors and transducers which enable proper operation of the gripper assembly 20, and these sensors and transducers are shown schematically in FIGS. 10 and 11. Sensor S1 operates to detect the trolley's location on the track 10 so that the movements of the trolley 5 can be controlled. Sensor S2 operates as a safety backup sensor for sensor S1 when the trolley 5 undergoes high velocity, long movements, and also operates to detect the first, outermost pair of flat glass sheets in a selected storage rack 3 when the trolley 5 undergoes slow velocity, glass sheet pair locating movements. Sensor S3 indicates when the lower frame assembly 30 is in its lowest position.

Transducer S4 slows down the lower frame assembly's velocity about 200 mm before it reaches its uppermost position. Sensor S5 indicates when the lower frame assembly 30 is in its uppermost position. Transducer S6 slows down the lower frame assembly's velocity about 200 mm before it reaches its lowermost position. Sensor S7 indicates when the gripper assembly 20 is within about 50 mm of a pair of flat glass sheets. Sensor S8 indicates when the gripper assembly 20 is in registry with the pair of flat glass sheets.

Sensor S9 indicates when the lower gripper 24 has reached the lower edges of the pair of flat glass sheets. Sensor S10 indicates when the upper gripper 22 has descended sufficiently to reach the upper edges of the pair of flat glass sheets. Sensor S11 indicates when the upper gripper 22 is at its uppermost position. Sensor S12 indicates when the lower frame assembly is about 500 mm from its lowermost position.

Figure 12:
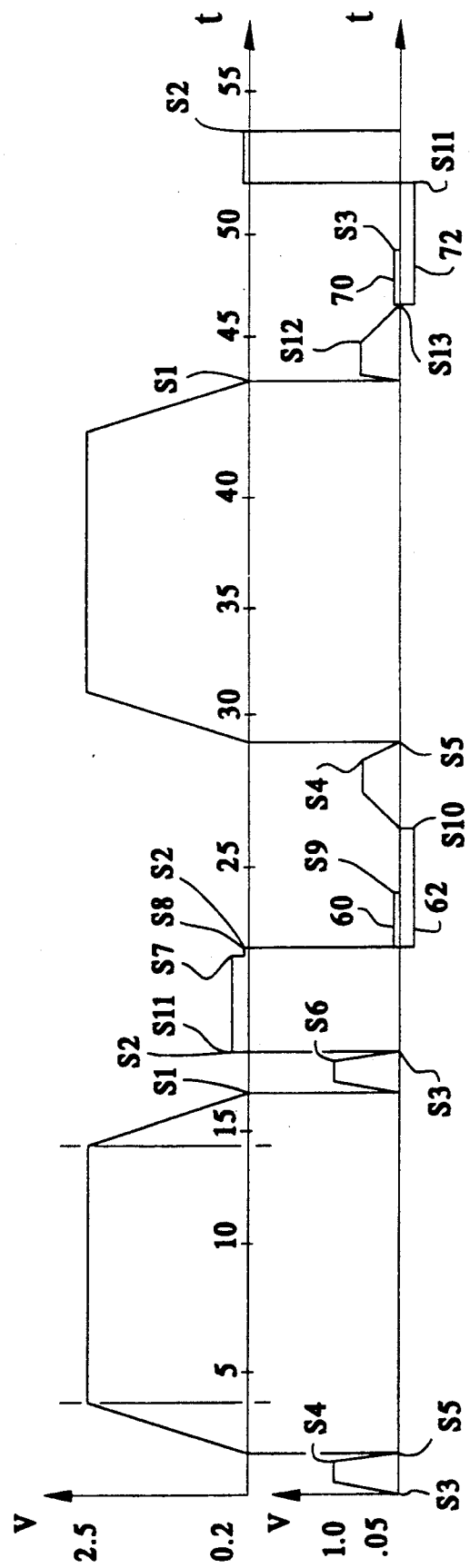
FIG. 12 is a set of two graphs showing the relationship between trolley velocity vs. time and gripper assembly velocity vs. time during a flat glass movement operation.

FIG. 12 includes graphs showing the relationship between trolley velocity vs. time and gripper assembly velocity vs. time, respectively, during a flat glass movement operation. On the graphs, the points at which the various sensors and transducers indicate or activate are shown, and so the operation of the trolley 5 in a flat glass movement operation will be described with reference to FIG. 12.

In operation, then, when the trolley 5 receives a command to pick up a pair of glass sheets from a specific storage rack 3, the sensor S3 is first checked to see if the lower frame assembly is in its lowermost position. If it is, the lower frame assembly 30 is raised until it is slowed by transducer S4 and finally stopped when sensor S5 indicates that the lower frame assembly 30 has reached its uppermost position, as shown in FIG. 12. Then, the trolley 5 travels in a high velocity, long movement, as indicated in FIG. 12, toward a particular location above a selected storage rack 3 until the sensor S1 indicates that the trolley is close to the particular location. The lower frame assembly 30 of the trolley is then lowered to its lowermost position, a movement which is slowed by transducer S6 and which is ended when sensor S3 indicates that the lower frame assembly 30 has reached its lowermost position. At this time the upper gripper 22 is maintained at its uppermost position, which is indicated by sensor S11. The trolley is then controlled to move in a slow velocity, glass sheet pair locating movement while the sensor S2 locates the first, outermost pair of flat glass sheets. After the first, outermost pair of flat glass sheets has been located, the trolley continues to move at a slow velocity until the sensor S7 indicates that the gripper assembly 20 is within about 500 mm of the pair of flat glass sheets, and then the trolley 5 is controlled to move at a very slow approach velocity.

Once the gripper assembly 20 comes into registry with the pair of flat glass sheets, which is indicated by the sensor S8, the trolley's movement is stopped. The lower frame assembly 30 is then raised until the sensor S9 indicates that the lower gripper 24 has reached the lower edges of the pair of flat glass sheets, as is indicated by the line 60 in FIG. 12, and the upper gripper 22 is lowered until the sensor S10 indicates that the upper gripper 22 has reached the upper edges of the pair of flat glass sheets, as is indicated by the line 62 in FIG. 12. The lower frame assembly 30 is then allowed to move upwards, and it is raised until it reaches its uppermost position, a movement which is slowed by the transducer S4, and which is ended once the sensor S5 indicates that the lower frame assembly 30 has reached its uppermost position.

The trolley 5 is then allowed to move again along the track 10 in a high velocity, long movement until the sensor S1 indicates that the trolley 5 has reached the end 40 of the first intermediate storage 1. The lower frame assembly 30 is then lowered until the sensor S12 indicates that the lower frame assembly 30 is about 500 mm from the lower frame assembly's lowermost position, i.e., when the lower frame assembly 30 is nearing the stand 6, and the lower frame assembly 30 is stopped when the sensor S13 indicates that the pair of flat glass sheets is in an unloading position in the stand 6. The lower frame assembly is then lowered further, as indicated by line 70 in FIG. 12, until sensor S3 indicates that the lower frame assembly has reached its lowermost position, while the upper gripper 22 is raised, as indicted by line 72 in FIG. 12, until sensor S11 indicates the upper gripper 22 has reached its uppermost position. The trolley 5 then backs away from the stand 6 until sensor S2 indicates that it is about 500 mm from the pair of bent glass sheets, and the operation is completed.

Figure 13:
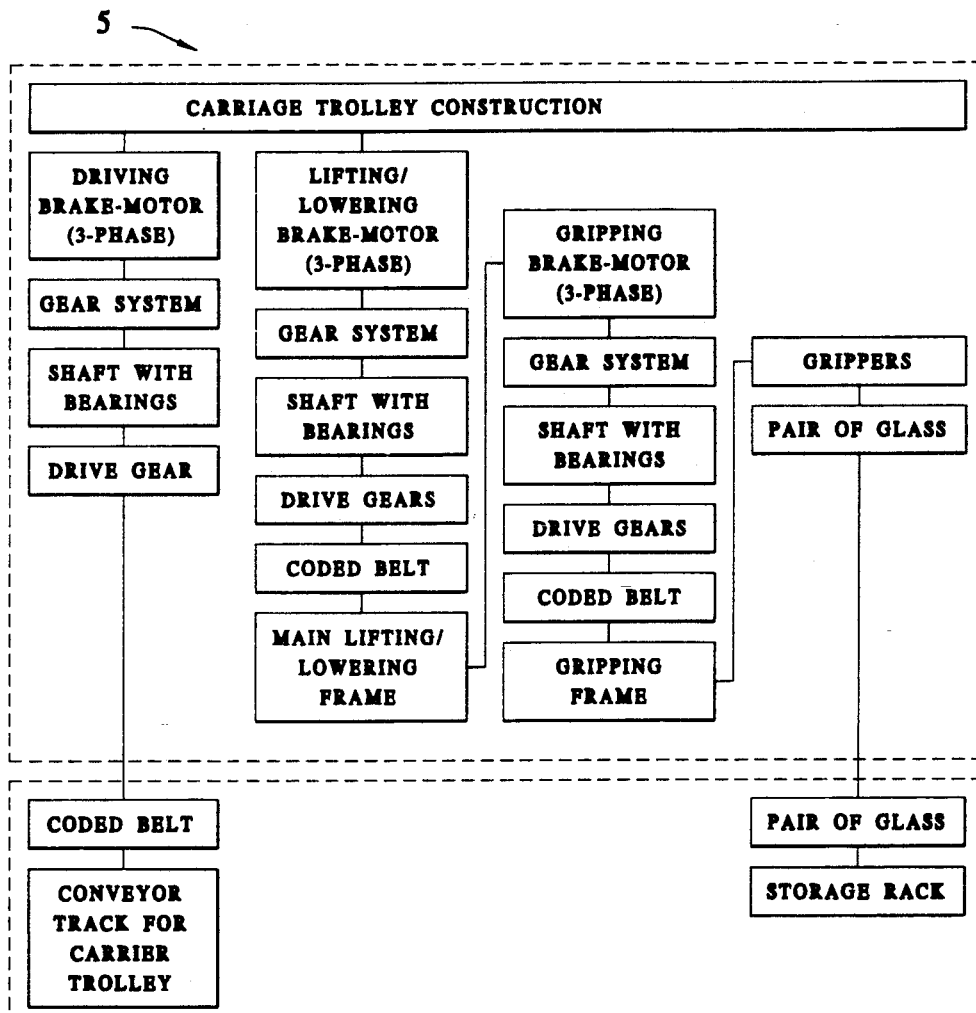
FIG. 13 is a block diagram of the construction of the trolley and the intermediate storage.

As is shown in the block diagram of FIG. 13, the carriage trolley 5 carries a 3-phase driving brake-motor which is drivingly connected to a gear system which is in turn connected to a drive shaft having bearings which drives a set of gears of the trolley 5. The drive gears mesh with a coded belt of the track 10 so that the trolley 5 can move along the track 10.

The trolley 5 also carries a 3-phase lifting/lowering brake-motor which is drivingly connected to a gear system which drives a shaft having bearings, as is diagrammed in FIG. 13. The shaft is drivingly connected to drive gears which drive a coded belt (belt 26), which in turn raises or lowers a main lifting/lowering frame (lower frame assembly 30). The main lifting/lowering frame in turn carries a 3-phase gripping brake-motor which is drivingly connected to a gear system which is drivingly connected to a shaft having bearings. The shaft drives drive gears which in turn drive a coded belt (belt 32) to raise or lower a gripping frame carrying grippers (upper gripper 22). The grippers in turn carry the pair of glass sheets, which they place into the intermediate storage 1 on a storage rack 3.

Figure 14:
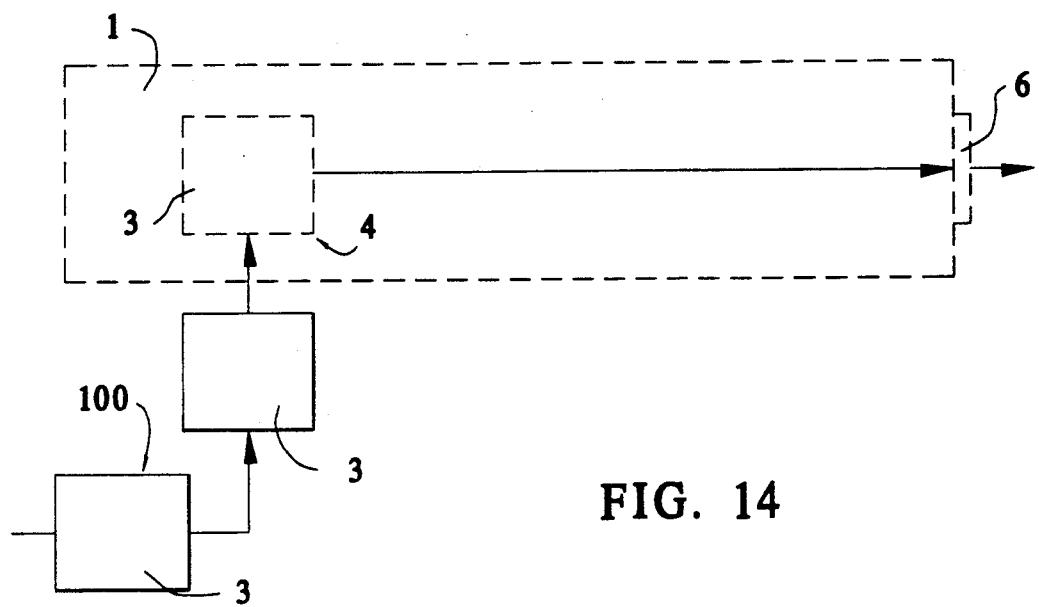
FIG. 14 is a block diagram of glass flow for flat glass sheets.

FIG. 14 illustrates the flow of a pair of glass sheets through the intermediate storage 1, which is also generally indicated by arrows A and C in FIG. 3. First, a storage rack 3 is either manually, robotically, or by manipulator loaded at a loading position 100 with pairs of flat glass sheets which are of exactly the same type. The fully-loaded storage rack is then brought to a location 4 within the intermediate storage 1 by a pedestrian-controlled truck, an industrial truck, or an automatic guided vehicle. The individual pairs of flat glass sheets are then brought one-by-one to the stand 6 by the carriage trolley 5 as described above. As each pair of flat glass sheets is unloaded into the stand 6, it is then carried to the bending furnace 11 either manually, robotically, or by manipulator.

Figure 15:
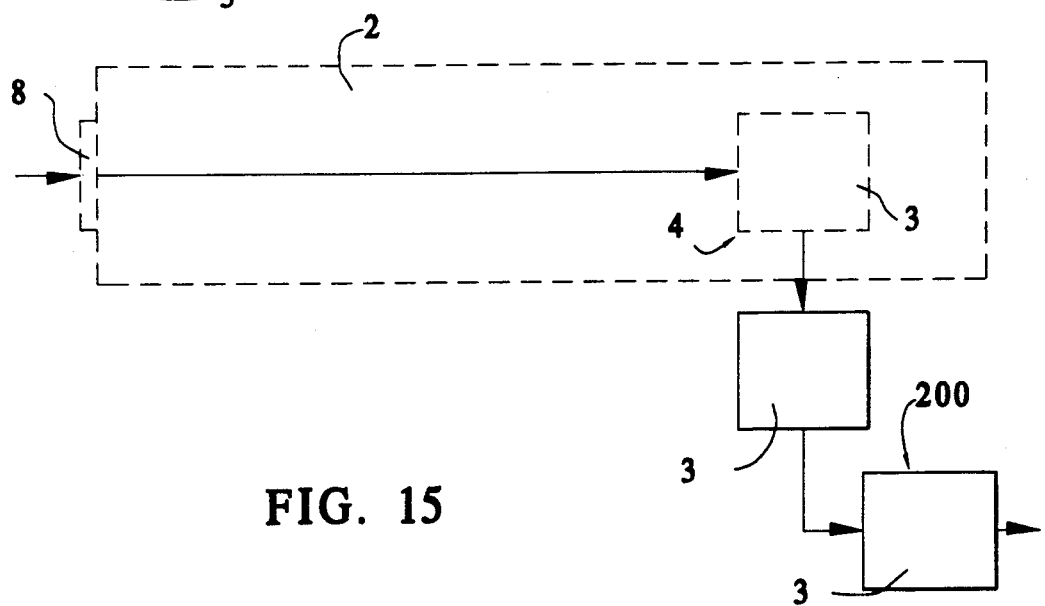
FIG. 15 is a block diagram of glass flow for bent glass sheets.

FIG. 15 illustrates the flow of a pair of bent glass sheets through the intermediate storage 2, which is also generally illustrated by arrows B and D in FIG. 3. First, pairs of bent glass sheets are carried one-by-one either manually, robotically, or by manipulator to the stand 8 on intermediate storage 2. The pairs of bent glass sheets are then carried one-by-one to a selected storage rack 3 in a location 4 in the intermediate storage 2 by the trolley 9. Once the storage rack 3 has been fully loaded with pairs of bent glass sheets, the storage rack 3 is carried away from the intermediate storage 2 to an unloading position 200 by either a pedestrian-controlled truck, an industrial truck, or an automatic guided vehicle. The pairs of bent glass sheets are then either manually, robotically, or by manipulator unloaded from the storage rack 3.

Figure 16:
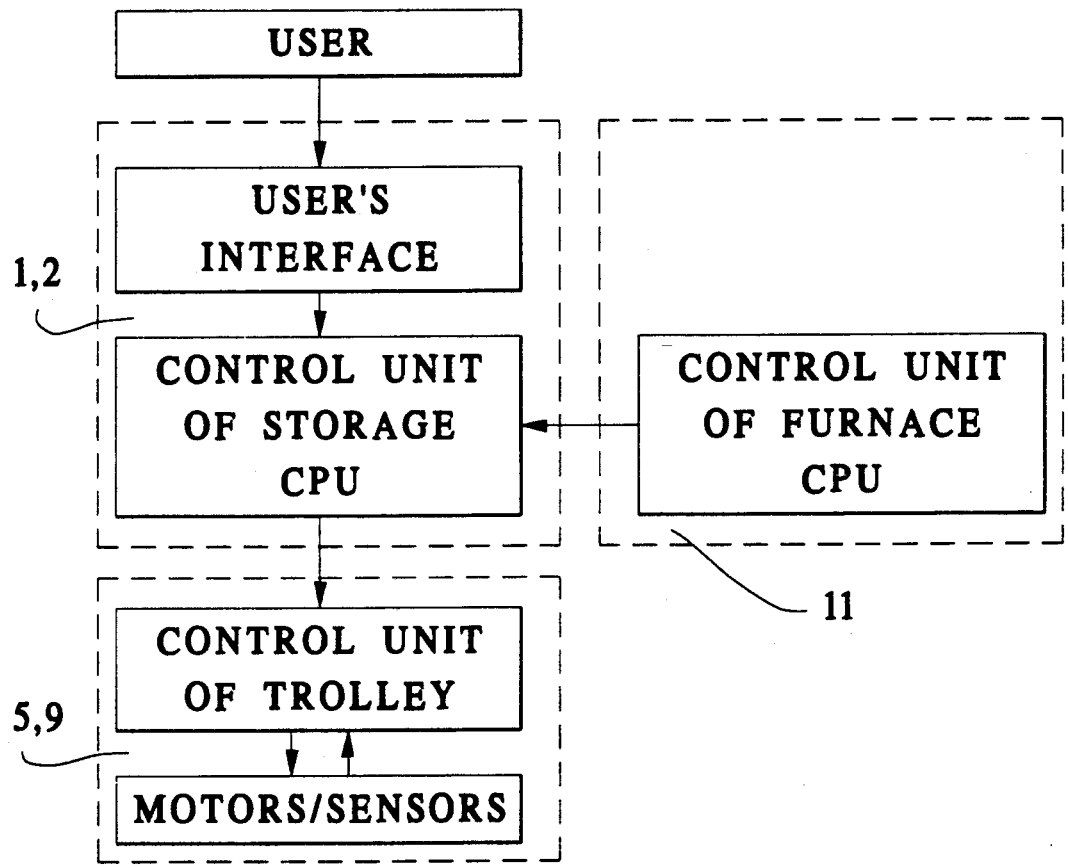
FIG. 16 is a block diagram of the control system of the intermediate storage system.
Figure 17:
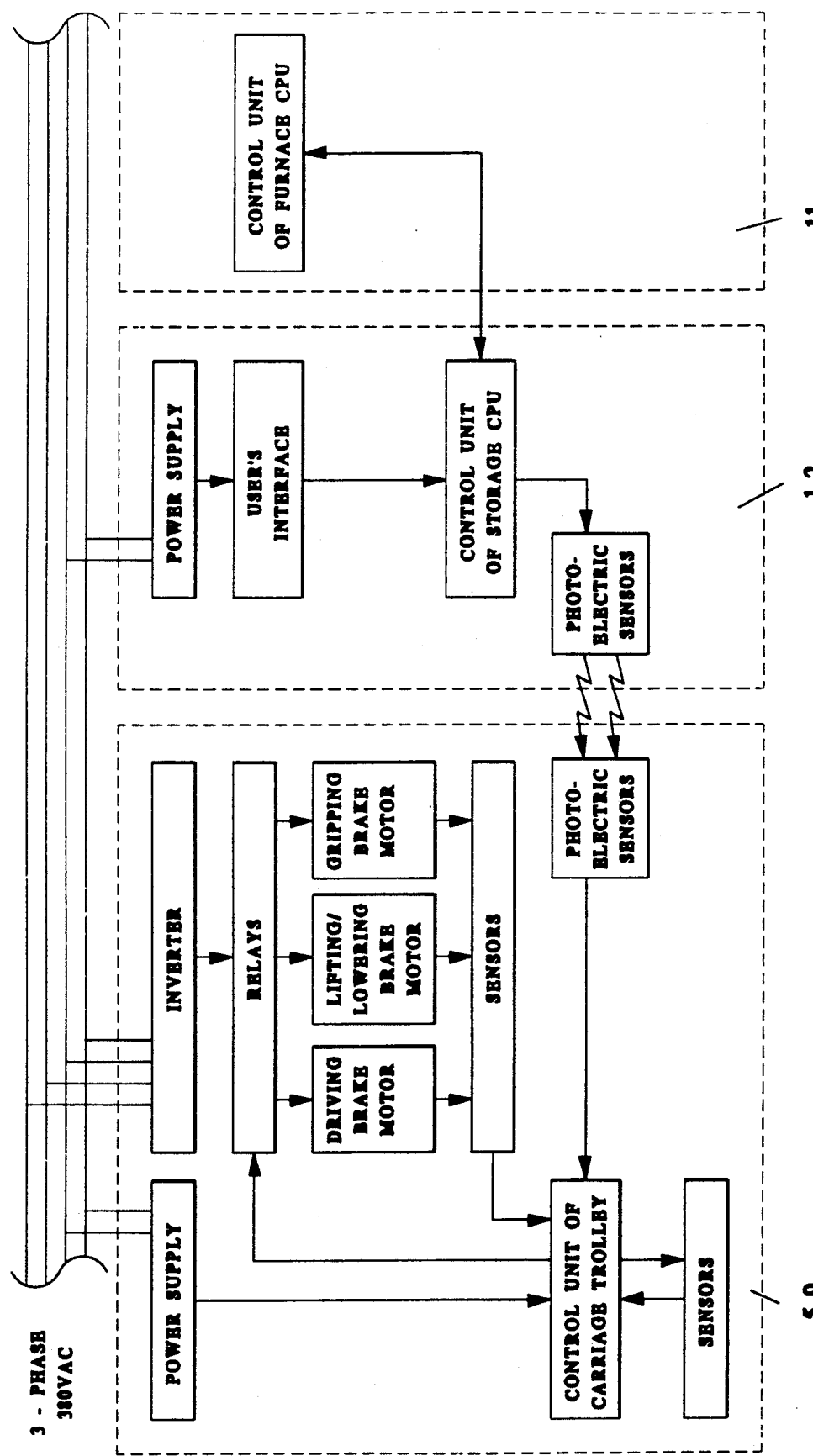
FIG. 17 is a more detailed block diagram of the control system of the intermediate storage system.

FIGS. 16 and 17 show, in varying amount of detail, the control system of the intermediate storage system. As shown in FIG. 16, a user interacts with a user interface of the intermediate storage control system to input a specific command, i.e., a reference number, an address, and a number of pairs of glass sheets. The user interface then communicates the specific information to a control unit of the storage CPU, which then communicates to the trolleys 5,9, by photoelectric sensors, information on pairs of glass sheets to carry, i.e., the address of particular pairs of glass sheets. The control unit of the storage CPU also communicates with a control unit of the bending furnace's CPU regarding, i.e., the reference numbers of pairs of glass sheets in the bending furnace 11.

As is seen in FIG. 17, the control units of the carriage trolleys 5,9 and the intermediate storages 1,2 are each powered by 220 V A/C power supplies which are in turn powered by a 3-phase 380 V A/C power line. As is also seen in FIG. 17, a control unit of a trolley sends and receives signals to and from the sensors and transducers S1-S13, and sends control signals to relays which control the driving brake-motor, the lifting/lowering brake-motor, and the gripping brake-motor. The relays are powered by the 380 V A/C power line through an inverter, and the brake-motors are monitored by sensors which send signals to the control unit of the carriage trolley. The above-described storage system for pairs of glass sheets allows for the utilization of advanced automation in the loading and unloading of a bending furnace.

One difference of the system of the present invention from the available systems is that just one pair of glass sheets is moved at a time while the rest of the pairs of glass sheets remain stationary. Thus, the system can be constructed less massively and it requires less floor space than a system in which storage racks are carried to a desired location. In addition, the system of the invention allows for highly flexible production planning and automatization.

The intermediate storages 1 and 2 included in this storage system can be arbitrarily mounted in different positions around the bending furnace.

We claim:

1. A method of intermediately storing pairs of flat glass sheets, comprising:

carrying said pair of flat glass sheets, along with other pairs of flat glass sheets, on a first storage rack to a first intermediate storage;

carrying said pair of flat glass sheets from said first storage rack to a first stand at an end of said first intermediate storage using a first carrier trolley;

carrying said pair of flat glass sheets from said stand to a bending furnace;

bending said pair of flat glass sheets in said furnace;

carrying said pair of bent glass sheets from said furnace to a second stand at an end of a second intermediate storage;

carrying said pair of bent glass sheets from said second stand to a second storage rack in said second intermediate storage using a second carrier trolley; and carrying said pair of bent glass sheets, along with other pairs of bent glass sheets, on said second storage rack away from said second storage.

2. A method as claimed in claim 1, wherein said carrying step of carrying said pair of flat glass sheets using said first carrier trolley includes lifting said pair of flat glass sheets from said first storage rack, carrying said pair of flat glass sheets to said end of said first intermediate storage area, and lowering said pair of flat glass sheets to said first stand.

3. A method as claimed in claim 1, wherein said carrying step of carrying said pair of bent glass sheets using said second carrier trolley includes lifting said pair of bent glass sheets from said second stand, carrying said pair of bent glass sheets to a location above said second storage rack, and lowering said pair of bent glass sheets onto said second storage rack.

4. A method as claimed in claim 1, wherein said first storage rack is removed from said first intermediate storage when said first storage rack is empty.

5. A method as claimed in claim 1, wherein said pair of bent glass sheets is carried away from said second intermediate storage when said second storage rack is fully loaded.

6. A method as claimed in claim 1, wherein said first carrier trolley runs on a first conveyor track located above both said first storage rack and said first stand, and said second carrier trolley runs on a second conveyor track located above both said second storage rack and said second stand.

7. A method as claimed in claim 1, wherein said first carrier trolley includes identification means for identifying said pair of flat glass sheets when said pair of flat glass sheets is a first, outermost pair of flat glass sheets on said first storage rack.

8. A method as claimed in claim 1, wherein a location of said firs storage rack and a location of said second storage rack in said first and second intermediate storage, respectively, are stored in a memory of an apparatus controlling movements of said first and second carrier trolleys.

9. A method as claimed in claim 1, wherein said first storage rack carries pairs of flat glass sheets which are of exactly a same type.

10. A method as claimed in claim 1, wherein said second storage rack carries pairs of bent glass sheets which are of exactly a same type.

* * * * *